United States Patent
Pursifull

(10) Patent No.: US 9,404,402 B2
(45) Date of Patent: Aug. 2, 2016

(54) EFFICIENT VEHICLE COMPONENT HEATING

(71) Applicant: Ford Global Technologies, LLC, Dearborn, MI (US)

(72) Inventor: Ross Dykstra Pursifull, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 842 days.

(21) Appl. No.: 13/742,272

(22) Filed: Jan. 15, 2013

(65) Prior Publication Data

US 2013/0125853 A1    May 23, 2013

Related U.S. Application Data

(63) Continuation-in-part of application No. 12/209,387, filed on Sep. 12, 2008, now Pat. No. 8,353,265.

(51) Int. Cl.
*B60H 1/00* (2006.01)
*F01M 5/00* (2006.01)
*B60H 1/22* (2006.01)
*F01M 5/02* (2006.01)

(52) U.S. Cl.
CPC .................. *F01M 5/001* (2013.01); *B60H 1/22* (2013.01); *F01M 5/02* (2013.01); *F01M 5/021* (2013.01)

(58) Field of Classification Search
CPC ......... F01M 5/001; F01M 5/02; F01M 5/021; B60H 1/22
See application file for complete search history.

(56) References Cited

U.S. PATENT DOCUMENTS

| | | | | |
|---|---|---|---|---|
| 3,591,079 A | * | 7/1971 | Peters | 237/8 A |
| 4,245,593 A | * | 1/1981 | Stein | 123/142.5 R |
| 4,249,491 A | * | 2/1981 | Stein | 123/142.5 R |
| 4,370,956 A | * | 2/1983 | Moser et al. | 123/196 AB |
| 4,393,824 A | * | 7/1983 | Fischer et al. | 123/196 AB |
| 4,427,150 A | * | 1/1984 | van Basshuysen et al. | 237/2 A |
| 4,556,024 A | * | 12/1985 | King et al. | 123/196 AB |
| 4,592,208 A | * | 6/1986 | Sollner et al. | 62/323.1 |
| 4,815,431 A | * | 3/1989 | Yorita et al. | 123/196 AB |
| 4,949,690 A | * | 8/1990 | Maurente et al. | 123/142.5 E |
| 5,159,910 A | * | 11/1992 | Ninomiya et al. | 123/196 AB |
| 5,408,960 A | * | 4/1995 | Woytowich | 123/142.5 E |
| 5,551,384 A | * | 9/1996 | Hollis | 123/142.5 R |

(Continued)

FOREIGN PATENT DOCUMENTS

WO    2007010685 A1    1/2007

OTHER PUBLICATIONS

Anonymous, "Intelligent Auxiliary Water Heater Pump Control for Automotive Applications," IPCOM No. 000138732, Published Jul. 31, 2006, 3 pages.

*Primary Examiner* — Hieu T Vo
*Assistant Examiner* — Sherman Manley
(74) *Attorney, Agent, or Firm* — Julia Voutyras; Alleman Hall McCoy Russell & Tuttle LLP

(57) ABSTRACT

Methods for achieving efficient vehicle component heating are provided. One example method for controlling the warming of powertrain lubricants during engine warm-up from a cold start, the engine having an output crankshaft, includes selectively driving a lubricant heating device with the crankshaft during the cold start based on lubricant temperature. The method further includes directing the powertrain lubricants to the lubricant heating device.

20 Claims, 10 Drawing Sheets

(56) References Cited

U.S. PATENT DOCUMENTS

| | | | |
|---|---|---|---|
| 5,573,184 A * | 11/1996 | Martin | 237/12.3 R |
| 5,644,924 A * | 7/1997 | Carr et al. | 62/133 |
| 5,727,510 A * | 3/1998 | Ban et al. | 123/142.5 R |
| 5,755,379 A * | 5/1998 | Ito | 237/12.3 R |
| 5,778,843 A * | 7/1998 | Inoue et al. | 123/142.5 R |
| 5,788,151 A | 8/1998 | Moroi et al. | |
| 5,852,995 A | 12/1998 | Aoki et al. | |
| 5,881,682 A * | 3/1999 | Hirose et al. | 122/26 |
| 5,934,360 A * | 8/1999 | Ban et al. | 165/43 |
| 5,947,376 A | 9/1999 | Moroi et al. | |
| 6,027,032 A | 2/2000 | Aoki et al. | |
| 6,082,316 A * | 7/2000 | Ban et al. | 123/142.5 R |
| 6,520,136 B2 | 2/2003 | Ito et al. | |
| 6,647,961 B2 * | 11/2003 | Suzuki et al. | 123/406.53 |
| 7,036,480 B2 * | 5/2006 | Williams et al. | 123/196 S |
| 7,077,224 B2 | 7/2006 | Tomatsuri et al. | |
| 7,189,065 B2 * | 3/2007 | Dudley | 417/313 |
| 2006/0065217 A1 | 3/2006 | Ikegawa | |
| 2007/0137594 A1 | 6/2007 | Boudard et al. | |
| 2010/0065376 A1 * | 3/2010 | Pursifull | 184/6.22 |

* cited by examiner

EFFICIENT VEHICLE COMPONENT HEATING

CROSS REFERENCE TO RELATED APPLICATIONS

The present application is a continuation-in-part of U.S. patent application Ser. No. 12/209,387 filed Sep. 12, 2008, now U.S. Pat. No. 8,353,265, the entire contents of which are incorporated herein by reference for all purposes.

FIELD

The present application relates to a system for heating lubricant(s) and/or maintaining lubricant temperature during engine warm-up from a cold start.

BACKGROUND & SUMMARY

Upon a vehicle cold start, the exhaust catalyst is heated, as well as engine and transmission lubricants. Catalyst heating may be achieved via the exhaust gas by retarding engine spark timing relative to peak torque timing or MBT (minimum spark advance for best torque). Further, as a result of engine operation, waste engine heat warms the powertrain lubricants, reducing lubricant viscosity (and decreasing engine friction) and thus improving fuel economy. Spark timing retard increases exhaust temperature, but does nothing to increase lubricant temperature. Nevertheless, due to emission requirements and catalytic converter performance, exhaust heat is generally prioritized higher relative to lubricant heating.

One approach to provide additional and more rapid heating to engine and transmission lubricants during engine start-up is presented in U.S. 2007/0137594. Specifically, a heat-exchange liquid circuit connected to a heat storage device controls engine lubricant temperature. Oil temperature is detected by a temperature sensor such that when oil temperature is lower than the desired temperature and lower than the heat exchange fluid, heat can be transferred to the oil to increase oil temperature and thus reduce viscosity.

However, the heat storage device may have limited heat capacity. As such, after long vehicle-off durations, there may be little to no additional heat available for transfer to the lubricant.

In one example, the above issues may be addressed by a method for controlling the warming of powertrain lubricants during engine warm-up from a cold start, the engine having an output crankshaft, comprising: selectively driving a lubricant heating device with the crankshaft during the cold start based on lubricating oil temperature; and directing the powertrain lubricants to the lubricant heating device. In some examples, the lubricant heating device is a shear device that is selectively coupled to the engine crankshaft, such that the device and the crankshaft are mechanically coupled at lower temperatures, and mechanically de-coupled at higher temperatures.

By selectively converting engine crankshaft torque into heat for lubricating oil based on the oil temperature, it is possible to decrease powertrain friction and improve fuel economy earlier during engine warm-up under appropriate conditions, without necessarily reducing exhaust heating. Rather, by increasing shaft torque during the cold start, exhaust heating can be maintained while increasing lubricant heating. Specifically, the fuel cost of increasing engine shaft work is countered by applying the shaft work to heat lubricants and thereby reduce friction. And, in some examples, sufficiently high exhaust temperatures may be achieved via the increased engine output such that less spark retard may be possible while still sufficiently heating the exhaust catalyst, thereby further reducing fuel consumption due to reduced spark-related losses. While the controlled heating torque is available, the need for fast acting torque reserve (via spark retard) may also be reduced, thus further reducing fuel consumption.

The heated lubricant may include one or both of engine and transmission oil. However, various other powertrain lubricants may also be used.

In another example, additional cabin heating may also be provided, for example, by ducting airflow past the alternator en route to the cabin, during engine warm-up before coolant temperature has warmed (e.g., to a selected threshold). In this way, warmer air can be provided to the cabin while also enabling faster warm-up of powertrain lubricants, as noted herein.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION OF THE DRAWINGS

Figure 1:
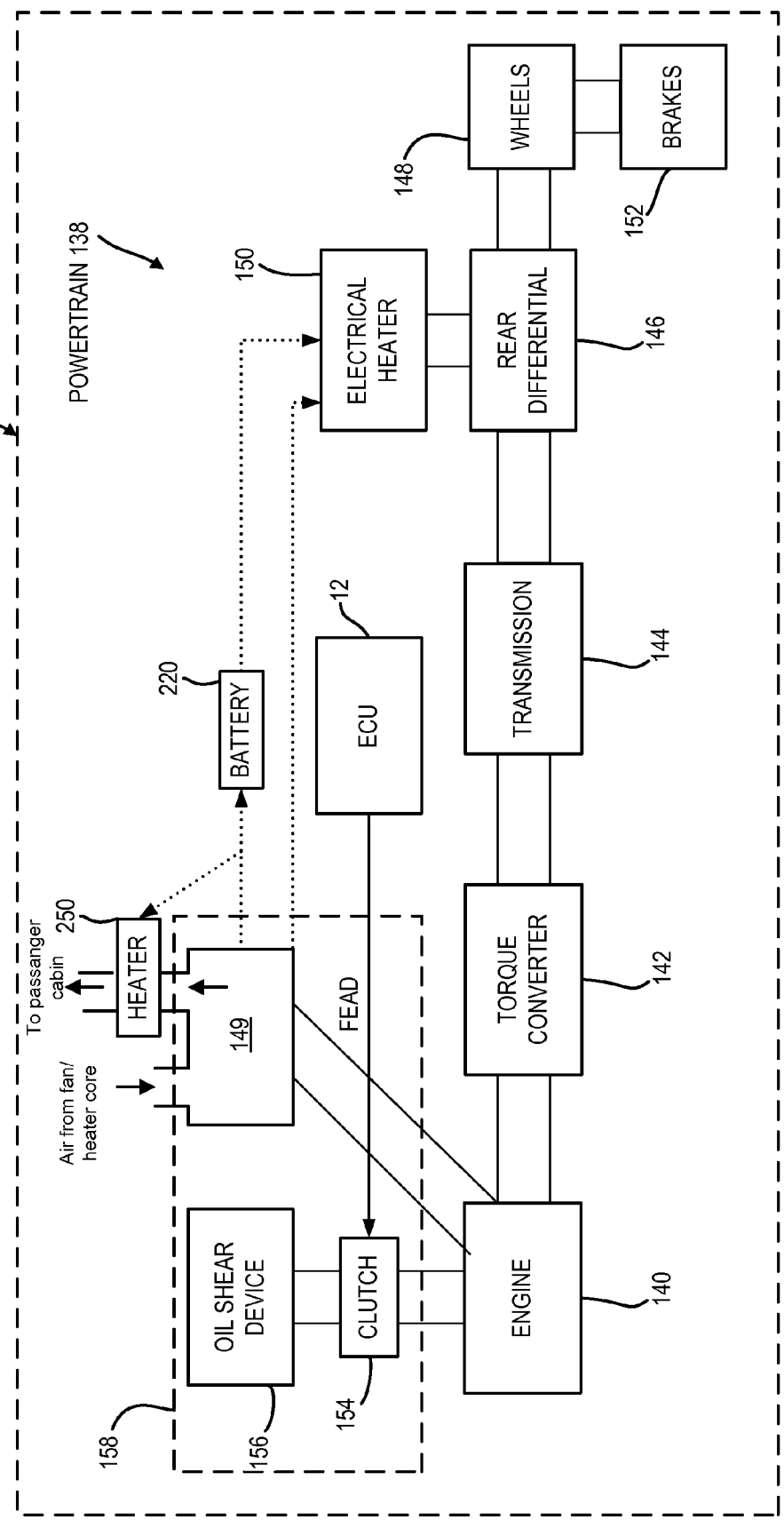
FIG. 1 is a block diagram of the engine system including an oil shear device.
Figure 3:
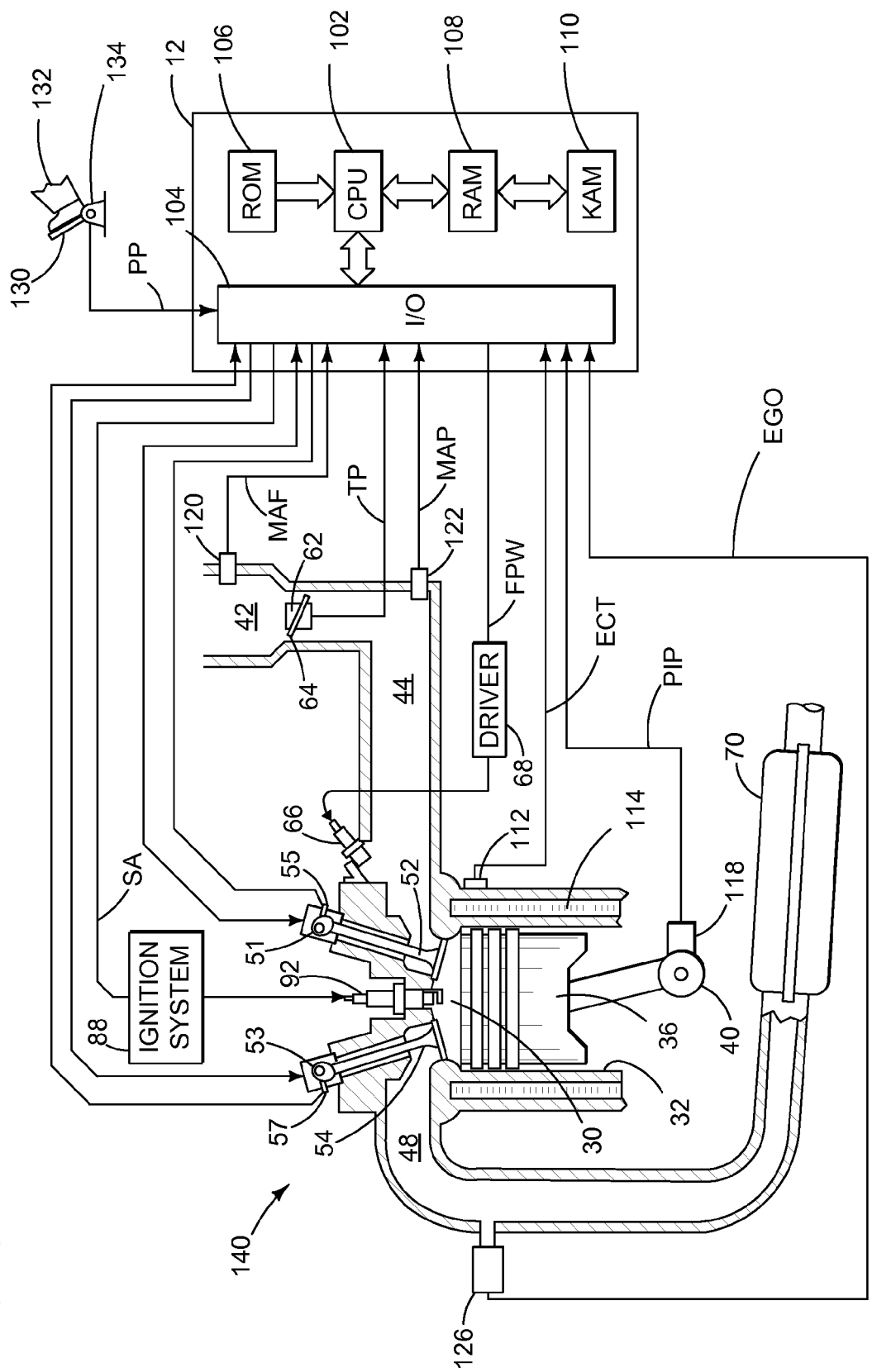
FIG. 3 shows an example of a port injection engine with cam actuation systems.
Figure 4:
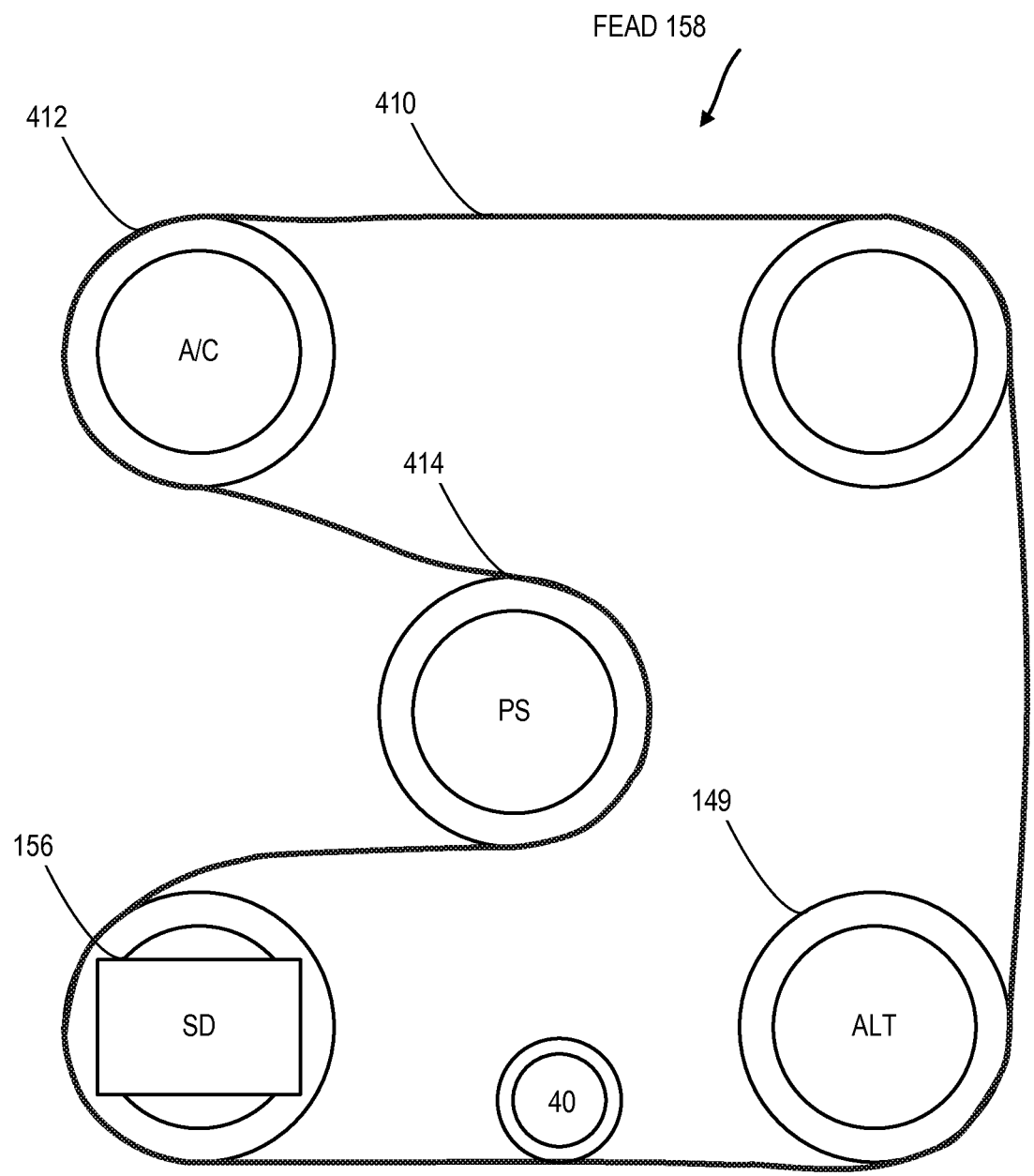
FIG. 4 is a schematic diagram of a front end accessory device (FEAD) including an oil shear device.

A vehicle powertrain is configured to heat engine and transmission lubricant(s) and/or maintain such lubricants at a desired temperature via a lubricant heating system. One example of such a configuration is illustrated in FIG. 1, and with additional details in FIG. 2. In one embodiment, an oil lubricant is heated with a lubricant heating device, such as an oil shear device, selectively coupled to the engine by a clutch to enable or disable the oil shear device. Further, another embodiment of the lubricant heating system includes an electrical heater selectively powered by engine output through an alternator. Additional details of an example engine are illustrated in FIG. 3. In one example, the lubricant heating device may be coupled to a front end accessory device (FEAD) of the engine, as illustrated in FIG. 4. In this case, a system of pulleys transfers mechanical energy from the crankshaft to various accessory devices, including the shear device. By this arrangement, the lubricant heating device can use the mechanical energy of the engine crankshaft to heat oil or other lubricants.

Figure 5:
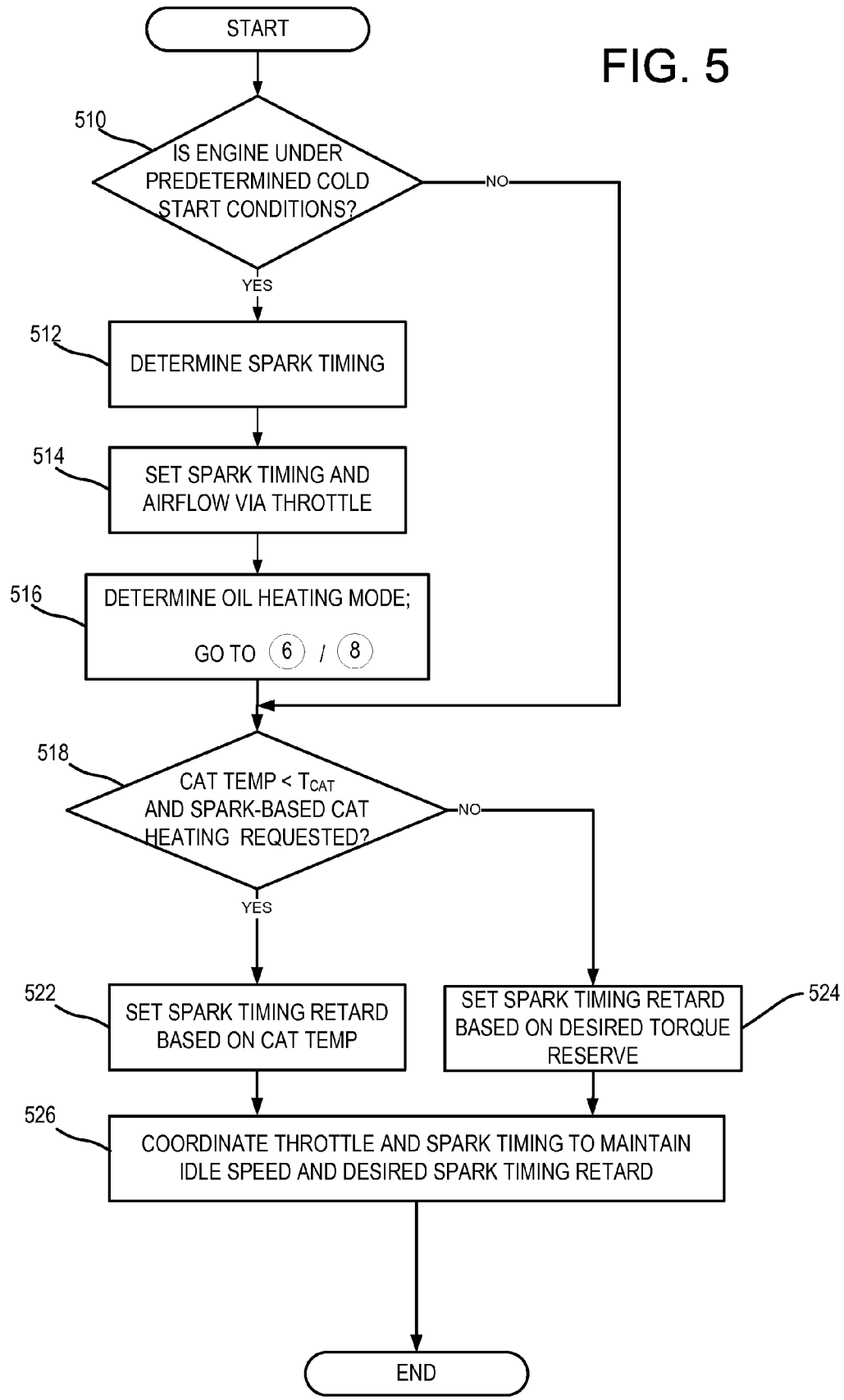
FIG. 5 is a flowchart describing a method for lubricant and catalyst heating.

A method for operating the engine in idle speed upon a cold start, including selection of a lubricant heating strategy for oil heating and catalyst heating, is shown in FIG. 5. An example mechanical mode of oil heating—mode 1—is further detailed in FIG. 6 and an example electrical mode of oil heating—mode 2—is further detailed in FIG. 8. Lubrication heating may be achieved, for example, by operating in mode 1, in mode 2, or by a combination of modes. Example operation during engine cold start and warm-up is illustrated in FIG. 7, including transitions between various operating modes.

Although this application is presented in the context of engine warm-up from a cold start, the concepts may be applied during engine warm-up responsive to a cooled engine, for example, if an engine is in idle mode for an extended period of time. Further, the approaches may be applied to hybrid electric vehicle as described herein.

Referring now specifically to FIG. 1, it illustrates vehicle powertrain 138 of a vehicle 139. The powertrain 138 includes an engine 140, torque converter 142, transmission 144, rear differential 146, and wheels 148. Lubricant heating systems may also be included, the systems including various lubricant heating devices. A first lubricant heating system includes the oil shear device 156 as the lubricant heating device. A second lubricant heating system, indicated by dashed lines, includes the alternator 149 coupled to the electrical heater 150 as the lubricant heating device. Further, the alternator 149 may be coupled to the electrical heater 150 via a battery 220 such that the battery provides power to the electrical heater. The electrical heater may include a resistive heater, radiant heater, or other similar electrically actuated heater.

The alternator may also be coupled to an electric heater 250 that heats air traveling to the passenger compartment, or cabin, of the vehicle. The air may first pass the alternator to receive waste heat from the alternator to cool the alternator and heat the air, and may also pass through an electrical heater 250 to further heat the air, such as when the heater core (and engine coolant) are below air temperature. In example, the alternator loading on the engine (as the alternator is driven by the engine front end accessory drive system via the engine crankshaft) may be increased during engine cold starting after a stable idle condition is achieved in order to generate increased current to driver heater 250 in response to a request from vehicle passengers for vehicle heating. In this way, by electrically connecting the alternator to the electric air duct heater, less spark retard may be used for coolant heating. Further, the increased alternator loading may be advantageous in increasing engine load and thus exhaust temperature and heat flux to the catalyst for improved catalyst light-off. Further, the battery charge may still be replenished by the increased alternator loading.

Figure 2:
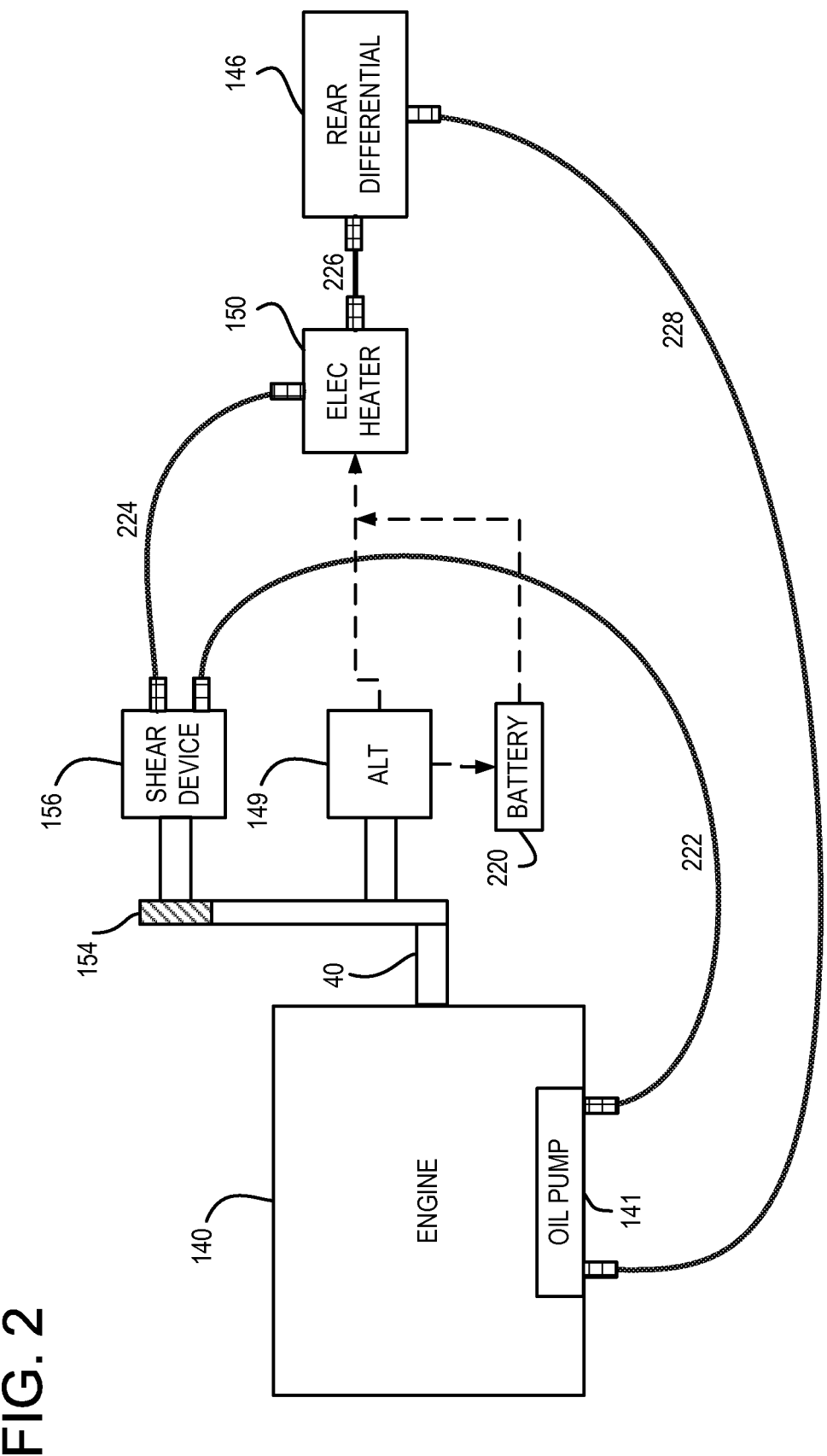
FIG. 2 is an example schematic diagram of lubricant flow.

Engine 140 is coupled to the oil shear device 156 via a clutch 154, as further illustrated in FIG. 2. In this example, the oil shear device is a component of the front end accessory device system (FEAD) 158, and is configured to heat engine and/or transmission lubricating oil, thereby reducing friction and improving vehicle efficiency. The oil shear device may comprise a plurality of parallel plates that rotate relative to one another with lubricant located therein, such as engine or transmission lubricating oil. The relative motion between the plates of the shear device thereby shears the lubricant, and generates heat. In one example, the shear device may be a multi-plate clutch device which, when engaged, increases temperature and decreases viscosity of the lubricant via production of friction heat.

The oil shear device may be controlled by a clutch 154 such that the oil shear device is coupled through the FEAD to the engine crankshaft when the clutch is engaged, and similarly un-coupled (such that the shear device does not operate to shear the medium) when the clutch is disengaged. Further, the clutch may operate to partially couple the engine to the shear device to thereby enable adjustment of the amount of shear device action on the medium. An oil shear mechanism may be similar to a wet clutch and thus these two functions may be integrated. Modulation of such a clutch/shear device can be through plates spacing, plate force, and/or fluid level. In the example embodiment of FIG. 2, modulation is achieved through actuation of the clutch.

Powertrain 138 further includes a torque converter 142 that is coupled between the transmission 144 and the engine 140. While not shown, the torque converter may include a controllable lock-up clutch. The transmission is further configured to drive wheels 148 through the rear differential 146. The wheels 148 are also shown coupled to wheel brakes 152.

In one example, the rear differential may be coupled to the electrical heater 150, where the electrical heater 150 may be configured to heat lubricant in the rear differential. Further, the electrical heater 150 may be powered by an alternator 149, driven by the engine. In this example, the alternator is in the FEAD 158. Heating of rear differential lubricant may be beneficial due to the positioning of the rear differential away from the engine and/or transmission. In this embodiment, the powertrain is outfitted with a rear differential 146 thus illustrating a rear-wheel drive configuration; however, a front-wheel drive configuration may also be used. In alternate embodiments, including those with front-wheel drive configurations, the electrical heater 150 may be coupled to the engine 140, for example, and the transmission 144 may be coupled to the wheels 148.

An electronic control unit (ECU) 12, further described in FIG. 3, receives varied information including lubricant temperatures, battery storage, engine speed, etc. The ECU may be configured to actuate (e.g., enable, disable, etc.) the clutch, as well as other actuators. Further, while in this example, a control system includes a single control unit 12, it will be appreciated in view of this disclosure that multiple distributed control units and controllers may comprise the control system.

In yet another example, not shown, the oil shear device may be driven by electrical power from the battery 220 or alternator 149. For example, the oil shear device may include an electric motor driven by power generated through the alternator via the engine, where the shear device mechanically heats the oil/lubricant through shearing, as noted above (as opposed to electrical heating).

FIG. 2 is a schematic diagram of lubricant (such as oil) flow through the shear device, electrical heater, and engine. It should be appreciated that FIG. 2 illustrates one example oil circuit, and various others may be used. Further, the engine may be a gasoline spark ignition engine, or alternatively may use other fuels, such as alcohols, diesel, etc.

In FIG. 2, engine 140 is shown having a crankshaft 40 which is selectively coupled to various devices of the FEAD, including the shear device 156 via controllable clutch 154, as well as alternator 149. The alternator 149 converts mechanical to electrical energy and may direct the resultant energy to power an electrical heater 150 or may direct the energy to storage in a battery 220. The ECU 12 may adjust the alternator field 149 to increase or decrease an amount of electrical energy generation. Further, the ECU may adjust the amount of electrical energy generation responsive to operation of the electrical heater, where the ECU increases energy generation (and thus load on the engine) when the electrical heater is active. In another embodiment, the alternator may be a generator.

In FIG. 2, oil is pumped through oil paths via an oil pump 141 in the engine. The engine crankcase may hold an oil reservoir coupled to the oil paths. In an alternate embodiment, several separate lubricant paths may exist, connecting the engine 140 to the shear device 156 and the electrical heater 150 to the rear differential 146, for example. In this case, each lubricant path may have separate lubricant pumps located in different components of the powertrain. In one example, lubricant flows between the engine, shear device, electrical heater, and rear differential as shown by the solid lines 222, 224, 226, and 228. This is not to suggest that the devices must have shared fluid. Rather, transfer of the fluid between devices enables heat transfer.

As shown in FIG. 2, alternator 149 may be controlled to deliver generated electrical energy to the electrical heater 150 and/or battery 220. Likewise, the battery 220 may be controlled to deliver electrical energy to electrical heater 150, as further described herein.

FIG. 3 is a schematic diagram showing one cylinder of a multi-cylinder engine 140, which may be included in a propulsion system of an automobile. Engine 140 may be controlled at least partially by a control system including ECU 12 and by input from a vehicle operator 132 via an input device 130. In this example, input device 130 includes an accelerator pedal and a pedal position sensor 134 for generating a proportional pedal position signal PP. Combustion chamber (i.e. cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 140.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by ECU 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal FPW received from ECU 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Intake passage 42 may include a throttle 62 having a throttle plate 64. In this particular example, the position of throttle plate 64 may be varied by ECU 12 via a signal provided to an electric motor or actuator included with throttle 62, a configuration that is commonly referred to as electronic throttle control (ETC). In this manner, throttle 62 may be operated to vary the intake air provided to combustion chamber 30 among other engine cylinders. The position of throttle plate 64 may be provided to ECU 12 by throttle position signal TP. Intake passage 42 may include a mass air flow sensor 120 and a manifold air pressure sensor 122 for providing respective signals MAF and MAP to ECU 12.

Ignition system 88 can provide an ignition spark to combustion chamber 30 via spark plug 92 in response to spark advance signal SA from ECU 12, under select operating modes. Though spark ignition components are shown, in some embodiments, combustion chamber 30 or one or more other combustion chambers of engine 140 may be operated in a compression ignition mode, with or without an ignition spark.

Exhaust gas sensor 126 is shown coupled to exhaust passage 48 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, during operation of engine 140, emission control device 70 may be periodically reset by operating at least one cylinder of the engine within a particular air/fuel ratio.

Electronic control unit 12 is shown in FIG. 3 as a microcomputer, including microprocessor unit 102, input/output ports 104, an electronic storage medium for executable programs and calibration values shown as read only memory chip 106 in this particular example, random access memory 108, keep alive memory 110, and a data bus. ECU 12 may receive various signals from sensors coupled to engine 140, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by ECU 12 from signal PIP. Manifold pressure signal MAP from a manifold pressure sensor may be used to provide an indication of vacuum, or pressure, in the intake manifold.

As described above, FIG. 3 shows only one cylinder of a multi-cylinder engine, and that each cylinder may similarly include its own set of intake/exhaust valves, fuel injector, spark plug, etc.

A front-end accessory device (FEAD) is illustrated in FIG. 4. A crankshaft 40 drives the FEAD devices through pulley 410, including an air conditioning compressor 412, power steering pump 414, alternator 149, and oil shear device 156.

In other embodiments, the oil shear device may be coupled directly or indirectly to the camshaft, oil pump, crankshaft, or timing chain.

Referring now to FIG. 5, a flowchart describes an example lubricant heating method for engine warm-up. First, it is determined if the engine is under predetermined cold start conditions 510 (e.g., engine coolant temperature is approximately equivalent to ambient temperature, and/or below a threshold temperature). If so, desired spark timing is determined 512, based on catalyst temperature and desired torque output, for example. Spark timing is set to the desired value at 514. Further, the throttle adjusts airflow in coordination with the spark timing and desired torque at 514.

Figure 6:
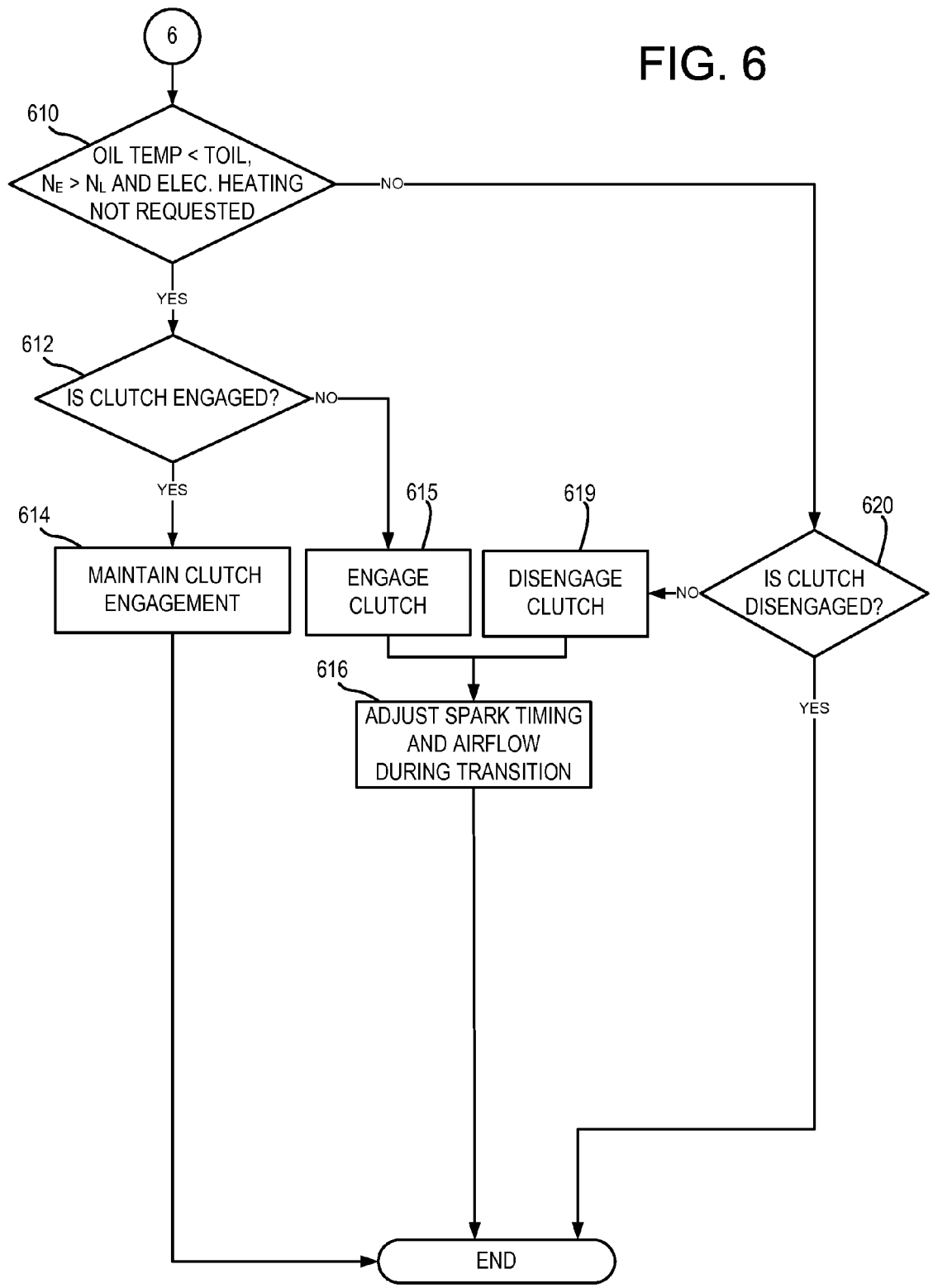
FIG. 6 is a flowchart describing a method for lubricant heating by way of a mechanical oil shear device.
Figure 7:
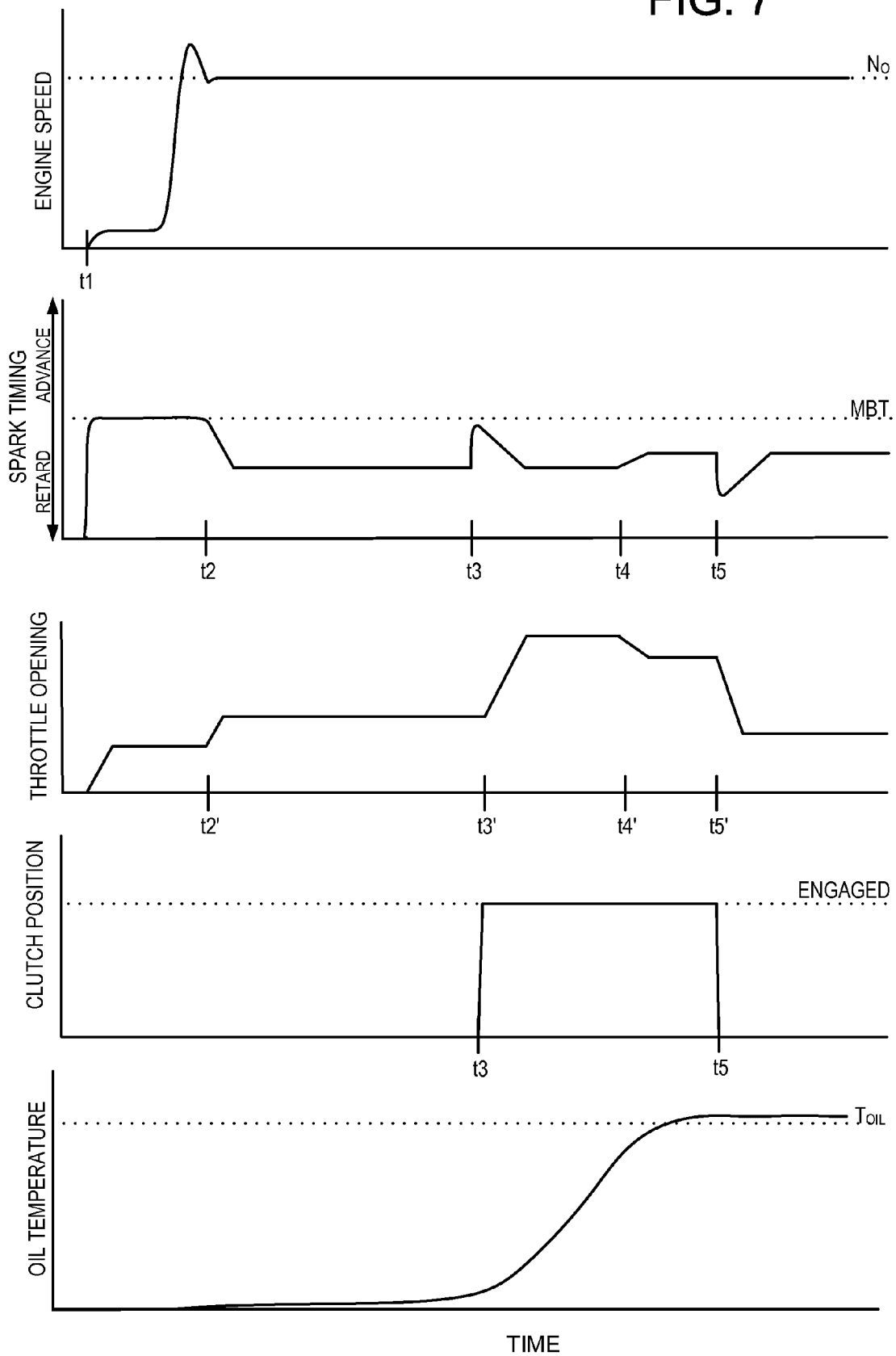
FIG. 7 illustrates a time series of events upon cold start of an engine including engagement of the clutch to the oil shear device.
Figure 8:
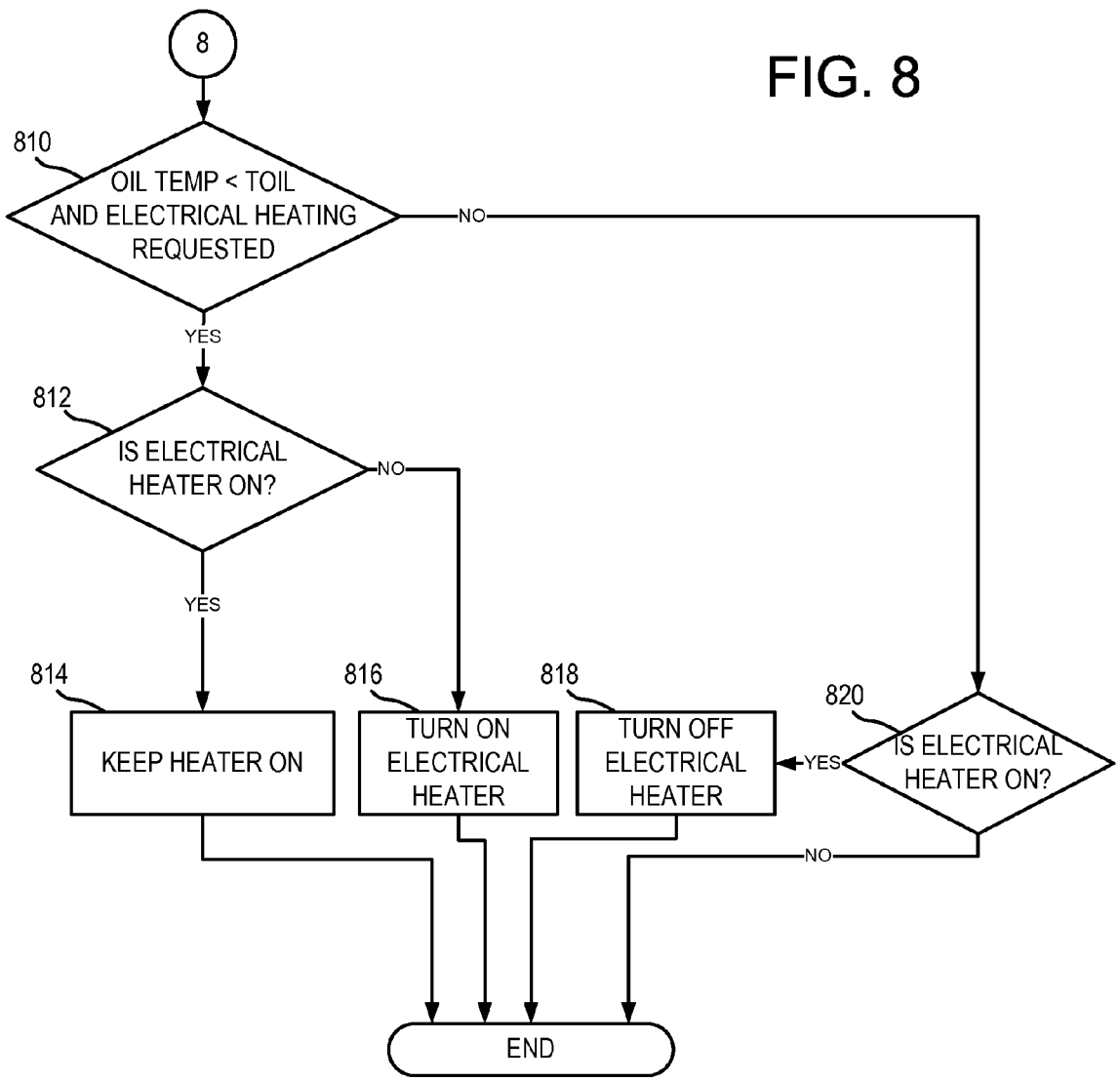
FIG. 8 is a flowchart describing a method for lubricant heating by way of an electrical heater.

At step 516, a lubricant heating strategy, comprising, for example: no heating, oil shear device heating, electrical heater heating, or a combination of mechanical and electrical heating is selected based on oil temperature, as described in FIG. 6 and/or FIG. 8.

Referring again to the lubricant heating strategy determined at step 516, it may be appreciated that the shear device and the electrical heater may be used independently, sequentially, or concurrently to heat a lubricant. For example, the shear device may be used, with no electrical heat generation, during a cold start when the oil temperature is below the desired threshold. The electrical heater may be used, independent of the shear device, for example, if the engine has degraded combustion performance, such as an identified engine mis-fire.

Further, the heating systems may be used sequentially. In one example of sequential heating, the oil shear device may be used (while the electrical heater is disabled), for a lower predetermined temperature range and the electrical heater may be used (while the shear device is disengaged), in a second, warmer temperature range. Thus, the electrical heater may be activated subsequent to completion of oil shear device operating, for example. During a warm start wherein lubricant heating is not requested, neither device may be activated. In contrast, during a very cold start, both devices may be activated concurrently.

The selection of an appropriate lubricant heating strategy may be further influenced by the battery state of charge. For example, if the battery state of charge is low, the electrical heater may be disabled whereas if the state of charge is high, the electrical heater may be enabled.

When an appropriate lubricant heating strategy is determined, lubricant heating is accomplished, such as described in FIG. 6 and/or FIG. 8. Once a lubricant heating strategy has been selected, the routine of FIG. 5 moves to step 518.

Referring again to FIG. 5, if the engine is not under predetermined cold start conditions, in this example, the routine continues from 510 to 518.

From either 510 or 516, at step 518, it is determined if the catalyst temperature is below the desired temperature for catalyst light-off $T_{CAT}$ and if spark-based catalyst heating is requested. If the answer is yes, spark timing is nominally retarded at 522 based on catalyst temperature to produce excess heat which can be directed to the exhaust outtake to increase catalyst temperature. For example, the amount of nominal spark retard may be increased at reduced catalyst temperatures. If the answer is no, spark timing is nominally retarded to provide a desired torque reserve at 524, such as a nominal torque reserve for idle speed control operation. Airflow and spark timing changes are coordinated to maintain engine speed at a desired speed, while also maintaining desired engine output torque at 526. It may be appreciated that the lubricant heating control and catalyst heating control may be coordinated concurrently to achieve improved heating.

FIG. 6 shows an example method for determining an oil heating mode of operation, using the mechanical oil shear device. A desired predetermined oil temperature threshold $T_{OIL}$ may be determined based on engine soak time, barometric pressure, ambient air temperature, etc. If the ECU indicates oil heat is below a predetermined threshold $T_{OIL}$, engine speed $N_E$ is above a low threshold $N_L$, and electrical heating is not requested 610, there is a check for clutch engagement 612. If the clutch is engaged at 612, the ECU maintains clutch engagement 614. If the clutch is not engaged, the ECU sends a signal to engage it 615, and engine torque is maintained through this clutch engagement transition by modulation of spark timing and airflow 616.

In one example, the throttle and spark timing may be adjusted such that rapid adjustment of spark timing counteracts the engagement and/or disengagement of the clutch, and then coordinated adjustment of the throttle and spark timing at a slower rate may be used to maintain the desired nominal spark timing retard. Various examples are illustrated with regard to FIG. 7.

If oil heating is not required 610 and the clutch is not disengaged 620, the ECU disengages the clutch 619, with compensatory spark timing and airflow changes 616, to disable the oil shear device. If the clutch is already disengaged 620, the routine ends.

A series of time diagrams illustrating example use of the shear device to heat oil after a cold start is illustrated in FIG. 7. Here, an oil shear device is selectively engaged to heat lubricating oil while spark timing and airflow via engine throttle are adjusted to compensate for the corresponding torque disturbances and maintain engine idle speed. Specifically, at t1, the engine is started and engine speed increases while spark timing is set to MBT. Subsequently, to achieve the desired torque reserve for idle engine speed control as well as catalyst heating, spark timing is nominally retarded at t2. At t2', throttle opening is increased to compensate for the otherwise decreased engine torque output that occurs as a result of retarding spark timing. Initially, the clutch to the shear device is disengaged and oil is passively heated by engine combustion heat transfer until t3, when the clutch is engaged. When the ECU sends a signal to engage the clutch at t3, it concurrently advances spark timing to compensate for the load applied to the engine (by the engagement of the clutch) such that engine speed is not disturbed. At t3', throttle opening is increased to maintain engine torque output while gradually returning the spark timing to the nominal retard and thereby continuing heating of the catalyst. At t4, catalyst light-off or another predetermined threshold is achieved, and spark timing retard can be reduced to a nominal advance advanced for improved torque efficiency while still providing sufficient torque reserve for idle speed control. Concurrently, engine torque is maintained by decreasing airflow so as to maintain idle engine speed. After t3, oil temperature rises above $T_{OIL}$, where the clutch can be disengaged at t5. Disengagement of the clutch at t5 results in a reduction of load on the engine; thus, spark timing is retarded to counteract the removal of the clutch load. After t5, spark timing is nominally advanced to so as to return to the nominal torque reserve retard and airflow is concurrently adjusted to maintain desired engine idle speed.

In another example, engine output torque and/or speed may be increased further when the clutch is engaged (e.g., after t3 and before t5 of FIG. 7), if a more rapid increase in oil temperature is desired. In yet another embodiment, the engine may be operated at an increased torque level between t3 and t5 due to loading of the alternator to power the oil shear device and/or the electrical heater.

In another example, electrical heaters coupled to the oil or other lubricant(s) may be activated, particularly if the oil shear device is operating at maximum capacity and further heating is desired. Decisions regarding activation of an electrical heater are shown in FIG. 8. If oil temperature is less than $T_{OIL}$ and the ECU 12 requests electrical oil heating 810, it is detected if the electrical heater 150 is on at 812. If so, the ECU 12 keeps the electrical heater 150 on at 814. If the electrical heater is not on, the ECU 12 turns on the electrical heater 150 at 816. If electrical oil heating is not requested 810, and the electrical heater 150 is on 820, a signal to turn off the electrical heater is sent 818.

The electrical heater 150 may be powered directly by an alternator 149 or directly by a battery 220 or some combination thereof. If the electrical heater is being powered by an alternator (e.g. engine is rotating), compensatory spark timing and airflow changes to maintain idle engine speed may be executed. If the electrical heater is being powered by a battery (e.g. engine is not rotating), as shown in FIG. 8, there may not be compensatory changes in spark timing and airflow if engine output torque is zero and thus undisturbed, for example.

Further, in an alternative embodiment, useful electrical energy via the alternator can be used for additional functions beyond lubricant heating. For example, heat produced in excess of that requested for oil and catalyst heating may be transferred to other vehicle components (e.g., supplemental cabin heat, windshield defrosting, etc.) and electrical energy produced in excess of that requested may be used to charge a battery, for example. Electrical energy stored in a battery may be used to electrically power the oil heating device when oil heating is desired before start of the engine (e.g., in a hybrid vehicle prior to a cold start). Note that the example control and estimation routines included herein can be used with various engine and/or vehicle system configurations. The specific routines described herein may represent one or more of any number of processing strategies such as event-driven, interrupt-driven, multi-tasking, multi-threading, and the like. As such, various acts, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated acts or functions may be repeatedly performed depending on the particular strategy being used. Further, the described acts may graphically represent code to be programmed into the computer readable storage medium in the engine control system.

Figure 9:
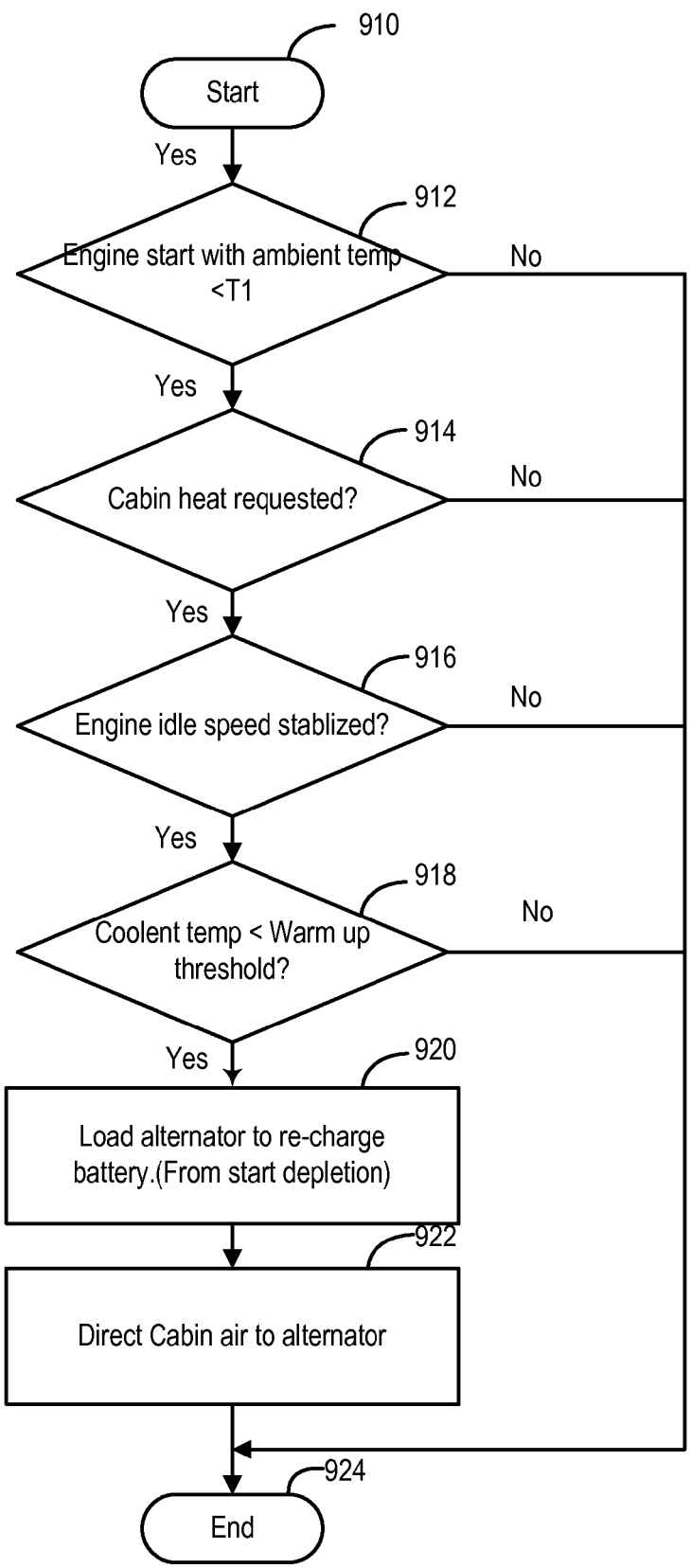
FIGS. 9 and 10 are flowcharts describing a method for cabin air heating.

In parallel with the operation of any one or more of FIGS. 5, 6, and 8, the control system may carry out the routine of FIG. 9. For example, during engine cold starting from low ambient temperatures (e.g., less than 40 F, T1) when cabin heat is requested at 910, the routine may continue to 912. The cabin heat request may be an operator request, such as via a temperature setting of a user interface in the vehicle, or may be a request generated based on various operating conditions, user inputs, etc. For example, the request may be based on a key-fob activation of the user, or may be generated from an app operating on a users personal computing device, such as a smart phone, communicating a desired cabin temperature to the vehicle before and/or during engine starting.

At 912, the routine determines whether the engine start is complete and the engine is in a stable idle condition with ambient temperature below a threshold T1, with engine idle speed controlled to the desired idle speed at 916, and with cabin heat requested at 914. Further, at 918 the routine determines whether the coolant temperature is colder than a warm-u coolant temperature threshold, as which the heater core provides sufficient heat to the air delivered to the cabin to provide the desired cabin temperature during operation of the vehicle's cabin HVAC (heating ventilation and cooling) system.

If the answers are yes, the routine continues to 920, where the alternator is loaded (or loading increased) to recharge the battery from the current depleted during engine cranking/starting. Additionally, the alternator may operate as noted above herein along with the operation of FIG. 9. Then, at 922, the cabin air is directed to the alternator, via ducting, to be heated by waste heat from the alternator and thus cool the alternator. Then the heated cabin air can be directed to the cabin to provide desired heating to the occupants.

In this way, during alternator operation in the warm-up condition, the alternator generates waste heat, which may be transmitted to airflow flowing in contact with the alternator (e.g., a heat sink of the alternator) to carry the waste heat to the vehicle cabin. Alternatively, when the answers above are no, the alternator is unloaded (or loading reduced) after the warm-up, or when additional cabin air heating is not required, for example. In this way, in addition to other warm-up operations, improved cabin heating can be provided. If the ambient temperature is too warm (e.g., greater than T1), this also indicates that additional heating of the intake air is not carried out via the alternator, or that alternator loading may be reduced such that there is insufficient waste heat to heat the air.

Figure 10:
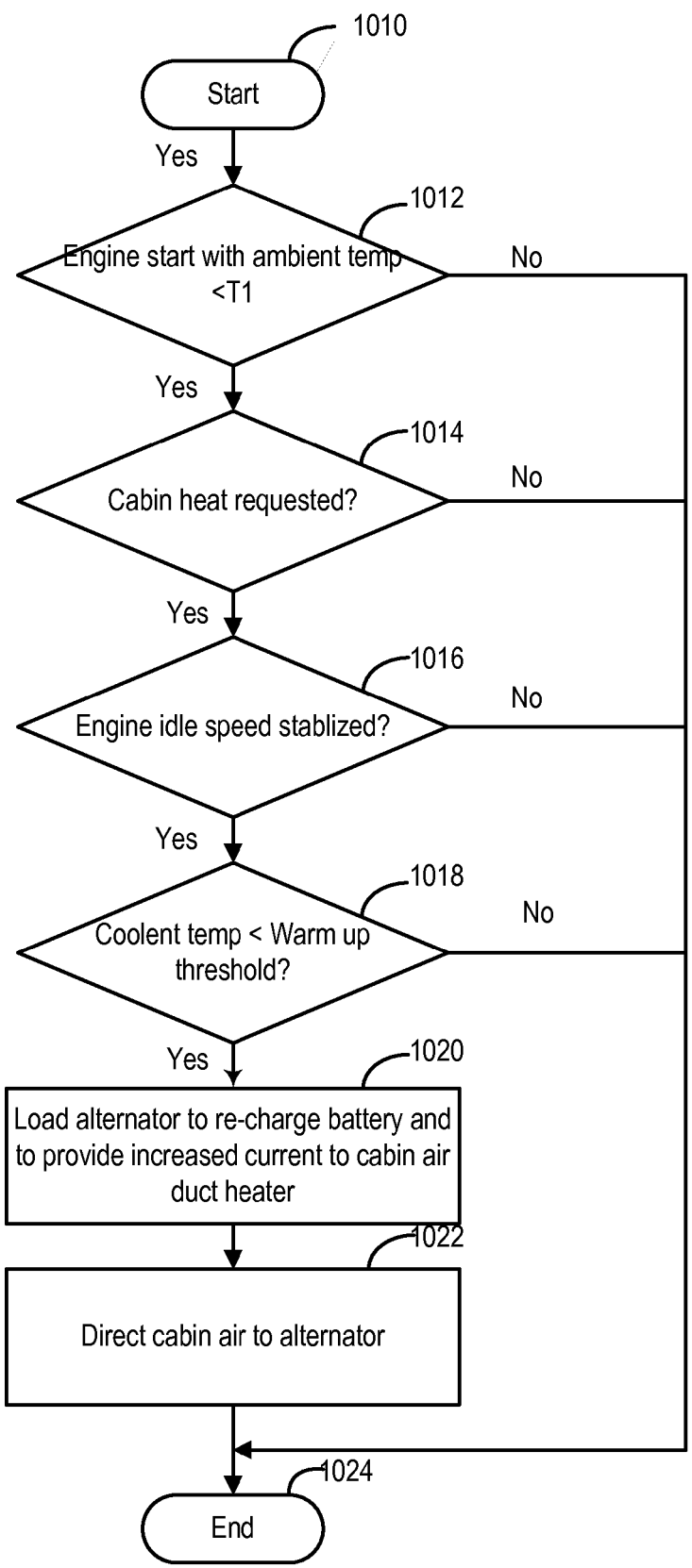

Referring now to FIG. 10, a routine similar to FIG. 9 is provided, which can be carried out in combination with the routine of FIG. 10. Blocks 1010, 1012, 1014, 1016, and 1018 are similar to those of FIG. 9. However, in the routine of FIG. 10, increased loading of the alternator generated increased current, at least some of which is provided to the cabin duct heater (e.g., heater 250) to heat air delivered to the cabin. In this way, a more efficient heating is provided, even while the engine is cold (e.g., coolant temperature cooler than ambient). Further, spark timing retard may be lessened (e.g., still retarded but to a lesser degree in response to providing electric cabin air heating) thereby reducing waste heat to the engine exhaust and related engine components. Further, once catalyst light off is achieved, spark timing retard may be reduced even if engine coolant temperature is not sufficiently high to provide desired cabin heating, with the missing heat made up via the cabin air heater and increased alternator loading, thus improving fuel economy.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Additionally, while in some examples a spark retard torque reserve is provided for idle speed control while extracting engine shaft work to heat lubricants via one of the example lubricant heating systems, alternative examples may utilize adjustment of the lubricant heating system to maintain engine idle speed. Thus, in one example, during idle speed control while the oil shear device is engaged, rather than (or in addition to) adjusting spark advance in response to a speed error (e.g., an unintentional drop in speed below the desired speed), the shear device clutch may be adjusted to reduce engagement of the shear device to the engine crankshaft, thereby reducing the FEAD loading on the engine to counteract the speed drop. Likewise, in another example, during idle speed control where the alternator is engaged to provide electrical power to the electrical heater, the alternator field may be adjusted in response to a speed drop to reduce FEAD loading on the engine. As such, the subject matter of the present disclosure includes all novel and nonobvious combinations and subcombinations of the various systems and configurations, and other features, functions, and/or properties disclosed herein.

The following claims particularly point out certain combinations and subcombinations regarded as novel and nonobvious. These claims may refer to "an" element or "a first" element or the equivalent thereof. Such claims should be understood to include incorporation of one or more such elements, neither requiring nor excluding two or more such elements. Other combinations and subcombinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method warming powertrain lubricating oil and cabin air during engine warm-up from a cold start, comprising:
    selectively driving an oil shear device via engagement and disengagement of a clutch coupled between a crankshaft and the oil shear device during the cold start based on powertrain lubricating oil temperature;
    directing the powertrain lubricating oil to the oil shear device;
    directing the powertrain lubricating oil to an electrical heater powered by an alternator; and
    flowing cabin air via ducting to the alternator, warming the cabin air via alternator waste heat.

2. The method of claim 1 wherein alternator loading is increased after engine starting and during the warm-up to recharge a vehicle battery and supply electrical power to the vehicle.

3. The method of claim 1 wherein the engagement is after the engine reaches a minimum engine speed after cranking.

4. The method of claim 1 where the selective driving includes coupling the oil shear device mechanically to the crankshaft when engine oil temperature is below a threshold temperature; and decoupling the oil shear device mechanically from the crankshaft when engine oil temperature is above the threshold temperature.

5. The method of claim 4 wherein the threshold temperature is selected from a range of threshold temperatures based on operating conditions.

6. The method of claim 1 wherein the oil shear device generates heat by mechanically shearing the engine oil without electrical heat generation in the oil shear device.

7. The method of claim 1 wherein during the selective driving of the oil shear device the engine generates increased output torque to maintain idle speed.

8. The method of claim 1 further comprising transitioning between engagement and disengagement of the oil shear device by adjusting spark timing retard of the engine and throttle opening of the engine to maintain engine idle speed.

9. The method of claim 1 further comprising adjusting ignition timing in response to engine speed to maintain idle speed during engagement of the oil shear device.

10. The method of claim 1 further comprising adjusting the selective engagement of the oil shear device in response to engine idle speed deviations to maintain idle speed.

11. A method for controlling warming of powertrain lubricants during engine warm-up operation from a cold start, the engine having an output crankshaft, comprising:
    selectively driving a heating system with the crankshaft during the cold start based on lubricating oil temperature and at least when catalyst temperature is less than a threshold value, and further while maintaining engine idle speed; and
    directing the powertrain lubricants to the heating system, wherein the heat generating system includes an electric machine and an electric heater, where the engine crankshaft drives the electric machine, and where the electric machine generates electrical energy to power the electric heater.

12. The method of claim 11 wherein the heating system further includes an energy storage device, and where the electric machine generates electrical energy stored in the energy storage device, and where the energy storage device supplies electrical power to the electric heater.

13. The method of claim 11, wherein the electric machine is an alternator, and where the selective driving includes adjusting a field of the alternator responsive to lubricant temperature.

14. A method of operating a vehicle having a powertrain including an engine, the powertrain further including a first lubricant heating device configured to selectively heat powertrain lubricating oil, comprising:
    during a first non-warmed engine start, selectively mechanically driving the first lubricant heating device from a crankshaft of the engine based on lubricant oil temperature, at least during a portion of the start, with ignition timing at a first location relative to a peak torque timing; and
    during a second engine start, operating with the first lubricant heating device driven to a lesser extent by the crankshaft of the engine than in the first condition, at least during a portion of the second start, with ignition timing at a second location more retarded than the first location, and with lubricant oil temperature higher during the second start than during the first start.

15. The method of claim 14 where said lesser extent is disengaged, where the first lubricant heating device is engaged during a first condition, and where engine combustion torque is higher on average during the first start portion than during the second start portion.

16. The method of claim 14 wherein the powertrain further includes a second lubricant heating device, the method further comprising during at least one of the first and second engine starts, electrically powering the second lubricant heating device.

17. A method for controlling warming of powertrain lubricants during engine warm-up operation from a cold start, the engine having an output crankshaft, comprising:
    during a first engine start, selectively driving a first heating system with the crankshaft during the first start based on lubricating oil temperature and while maintaining engine idle speed, the first heating system including an electric machine and an electric heater, where the engine crankshaft drives the electric machine, and where the electric machine generates electrical energy to power the electric heater; and
    during a second engine start, selectively and mechanically driving a second heat generating system with the crankshaft during the second start based on lubricating oil temperature and while maintaining engine idle speed, the second heat generating system including a clutch selectively coupling a shear device mechanically to the crankshaft; and directing the powertrain lubricants to the first and second heat generating systems.

18. The method of claim 17 wherein the electric machine is an alternator coupled as a front end accessory device of the engine, and where the shear device is coupled as a front end accessory device of the engine, and where the shear device is a multi-plate shearing device.

19. The method of claim 18 wherein the powertrain lubricant is engine oil.

20. A method, comprising:
    heating a passenger compartment of a vehicle by ducting airflow to absorb waste heat from an engine alternator en route to the passenger compartment, during engine warm-up before coolant temperature has warmed to a threshold.

* * * * *